(12) United States Patent
Sawada et al.

(10) Patent No.: US 11,268,672 B2
(45) Date of Patent: Mar. 8, 2022

(54) LIGHT DISTRIBUTION CONTROL APPARATUS FOR VEHICLE

(71) Applicant: Toyota Jidosha Kabushiki Kaisha, Toyota (JP)

(72) Inventors: Tomonari Sawada, Nagoya (JP); Tatsuya Takagaki, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 41 days.

(21) Appl. No.: 16/844,392

(22) Filed: Apr. 9, 2020

(65) Prior Publication Data

US 2020/0326049 A1  Oct. 15, 2020

(30) Foreign Application Priority Data

Apr. 15, 2019 (JP) .............................. JP2019-076757

(51) Int. Cl.
*B60Q 1/08* (2006.01)
*F21S 41/663* (2018.01)
*F21W 102/13* (2018.01)

(52) U.S. Cl.
CPC ............ *F21S 41/663* (2018.01); *B60Q 1/085* (2013.01); *B60Q 2300/10* (2013.01); *F21W 2102/13* (2018.01)

(58) Field of Classification Search
CPC ........................... B60Q 2300/142; B60Q 1/34
See application file for complete search history.

(56) References Cited

U.S. PATENT DOCUMENTS

| 2002/0036901 | A1* | 3/2002 | Horii | B60Q 1/18 |
| | | | | 362/37 |
| 2004/0114379 | A1* | 6/2004 | Miller | B60Q 1/085 |
| | | | | 362/464 |
| 2013/0076240 | A1 | 3/2013 | Endo et al. | |
| 2018/0038568 | A1* | 2/2018 | Sawada | B60Q 1/085 |

FOREIGN PATENT DOCUMENTS

| JP | 2005-007973 A | 1/2005 |
| JP | 2006-248246 A | 9/2006 |
| JP | 2009-123566 A | 6/2009 |
| JP | 2013-067343 A | 4/2013 |
| JP | 2018-020683 A | 2/2018 |

* cited by examiner

*Primary Examiner* — Amy Cohen Johnson
*Assistant Examiner* — Jianzi Chen
(74) *Attorney, Agent, or Firm* — Dinsmore & Shohl LLP

(57) ABSTRACT

A light distribution control apparatus comprises an irradiating apparatus and an irradiation control apparatus. When a vehicle is travelling on an own lane, the irradiation control apparatus lightens a first region including a region right in front of the vehicle using the irradiating apparatus. When a request for lane change to a target lane occurs under a situation where the vehicle is travelling on the own lane, the irradiation control apparatus lightens a second region using the irradiating apparatus, the second region including a region-at-a-lane-change-side positioned at a target lane side with respect to the first region and a reduced region which is a region where the first region is reduced to a region near the vehicle as well as control the irradiating apparatus so that illuminance in the reduced region becomes less than or equal to illuminance in the reduced region before the request for lane change occurs.

3 Claims, 10 Drawing Sheets

LIGHT DISTRIBUTION CONTROL APPARATUS FOR VEHICLE

CROSS-REFERENCE TO RELATED APPLICATIONS

This application claims priority to Japanese patent application No. JP 2019-076757 filed on Apr. 15, 2019, the content of which is hereby incorporated by reference in its entirety.

TECHNICAL FIELD

The present disclosure relates to a light distribution control apparatus for vehicle to control light distribution of an irradiating apparatus of a vehicle.

BACKGROUND ART

A light distribution control apparatus for vehicle to control light distribution of an irradiating apparatus (typically a head lamp) of a vehicle has been conventionally known. For example, Japanese Patent Application Laid-Open (kokai) No. 2005-7973 discloses a light distribution control apparatus for vehicle to change a lighting region of an irradiating apparatus in response to a steering angle of a steering wheel.

In the present disclosure, "control light distribution of an irradiating apparatus" means to control at least one of a lighting region which is a region lightened by the irradiating apparatus and illuminance in this lighting region.

SUMMARY

In recent years, the light distribution control apparatus for vehicle has been improved for various purposes. As one example, a light distribution control apparatus for vehicle has been known, this apparatus being configured to control light distribution of the irradiating apparatus so as not to lighten a region where a preceding vehicle is travelling but so as to selectively lighten a region where a pedestrian is present on an own lane on which the vehicle is currently travelling or in a vicinity of this own lane. According to this configuration, it becomes possible to reduce a possibility to give glare to the preceding vehicle as well as to improve visibility during nighttime travelling.

However, sufficient study has not been made so far regarding light distribution at a timing of changing lanes. That is, in general, when a vehicle is continuously travelling on a same lane, the light distribution control apparatus for vehicle lightens a region in front of the vehicle in such a manner that a peak of distribution of light intensity is positioned in this region, and thus a target lane (a lane adjacent to the own lane at a lane change side) is not fully lightened. In this case, it is difficult for a driver or a visible light camera to obtain information on whether or not there does not exist an object (typically, an other vehicle) on the target lane which is likely to interfere with lane change. Accordingly, there may arise a case where the driver or a lane change assist apparatus comprising the visible light camera determines that the lane change is impossible in spite of the lane change being actually feasible.

The present disclosure is made to resolve the problem above. That is, one of objects of the present disclosure is to provide a light distribution control apparatus for vehicle capable of changing a lighting region of a irradiating apparatus upon a request for lane change so as to facilitate determination of whether or not the lane change is feasible as well as restricting a degree of increase in power consumption due to the change of the lighting region.

A light distribution control apparatus for vehicle according to the present disclosure (hereinafter, also referred to as a "present disclosure apparatus") comprises;

an irradiating apparatus (31) configured to irradiate light in front of an own vehicle (100); and an irradiation control apparatus (10, 30) configured to control the irradiating apparatus (31) to be capable of changing a lighting region which is a region lightened by the irradiating apparatus (31) as well as illuminance in the lighting region, wherein, the irradiation control apparatus (10, 30) is configured to;

when the own vehicle (100) is travelling on an own lane (L1), lighten a predetermined first region (Rn) including a region right in front of the own vehicle (100) using the irradiating apparatus (31); and when a request for lane change to a target lane (L2) adjacent to the own lane (L1) occurs under a situation where the own vehicle (100) is travelling on the own lane (L1), lighten a predetermined second region (Rlc) using the irradiating apparatus (31), the second region (Rlc) including a region-at-a-lane-change-side (Rlc1) positioned at the target lane side with respect to the first region (Rn) and a reduced region (Rlc2) which is a region where the first region (Rn) is reduced to a region near the own vehicle (100) as well as control the irradiating apparatus (31) in such a manner that illuminance in the reduced region (Rlc2) becomes less than or equal to illuminance in the reduced region before the request for lane change occurs.

According to the present disclosure apparatus, when the request for lane change occurs, the lighting region is changed from the first region to the second region. The second region includes the region-at-a-lane-change-side positioned at the target lane side with respect to the first region (a region including a region right in front of the own vehicle). Therefore, it becomes easier to obtain the information on whether or not there does not exist an object on the target lane which is likely to interfere with the lane change. As a result, it becomes easier to determine whether or not the lane change is feasible when there is the request for lane change during nighttime travelling. In addition, according to the present disclosure apparatus, the second region includes the region-at-a-lane-change-side mentioned above and the reduced region which is a region where the first region is reduced to a region near the own vehicle. The illuminance in this reduced region is changed to be less than or equal to the "illuminance in a region corresponding to this reduced region before the request for lane change occurs". As described above, when the request for lane change occurs, the first region is reduced to the reduced region as well as the illuminance in the reduced region is changed to be less than or equal to the "illuminance in a region corresponding to this reduced region before the request for lane change occurs". According to this configuration, a degree of increase in power consumption due to changing the lighting region so as to include the region-at-a-lane-change-side.

Another aspect of the present disclosure further comprising a lane width obtaining apparatus (16, 19, 20) configured to obtain a lane width of the target lane (L2), wherein, when the request for lane change occurs, the irradiation control apparatus (10, 30) is configured to control the irradiating apparatus (31) based on the obtained lane width in such a manner that the region-at-a-lane-change-side (Rlc1) includes a carriageway marking line (51, 52) dividing the target lane (L2).

According to this configuration, when the request for lane change occurs, the region-at-a-lane-change-side includes a carriageway marking line(s) dividing the target lane. Therefore, it becomes possible to obtain more accurate information on whether or not there does not exist an object on the target lane which is likely to interfere with the lane change.

In another aspect of the present disclosure, the irradiation control apparatus (10, 30) is configured to control the irradiating apparatus (31) in such a manner that lengths of the second region (Rlc) in a lane axis direction of the own lane (L1) and the target lane (L2) become longer as a vehicle speed (V) of the own vehicle (100) increases.

In general, a trajectory of the own vehicle for the lane change elongates in a travelling direction as the vehicle speed of the own vehicle increases. Therefore, according to the above configuration, the second region is likely to include the trajectory for the lane change and thus it becomes possible to further surely determine whether or not the lane change is feasible.

In the above description, references used in the following descriptions regarding embodiments are added with parentheses to the elements of the present disclosure, in order to assist in understanding the present disclosure. However, those references should not be used to limit the scope of the present disclosure.

DESCRIPTION OF THE EMBODIMENT

Embodiment (Configuration)

A light distribution control apparatus for vehicle according to an embodiment of the present disclosure (hereinafter, also referred to as a "present embodiment apparatus") is applied to a vehicle (automobile). Hereinafter, a vehicle on which the present embodiment apparatus is mounted will be also referred to as an "own vehicle" in order to distinguish it from other vehicles. The present embodiment apparatus is an apparatus to improve visibility of a space at a lane change destination by controlling a head lamp 31 shown in FIG. 1 in a case when a request for the lane change has been made by a driver during nighttime travelling. The present embodiment assumes two types of cases as a case where the request for the lane change is made by the driver. That is, a first case is a case where performance of lane change assist control (mentioned later) is requested by the driver and a second case is a case where the lane change is attempted by driving operation of the driver him/herself. When the present embodiment apparatus controls the head lamp 31 in a case when the request for the lane change has been made by the driver, in the first case, it becomes possible to properly determine whether or not the present embodiment apparatus can perform the lane change assist control safely, and in the second case, it becomes possible to properly determine whether or not the driver can perform the lane change safely.

Figure 1:
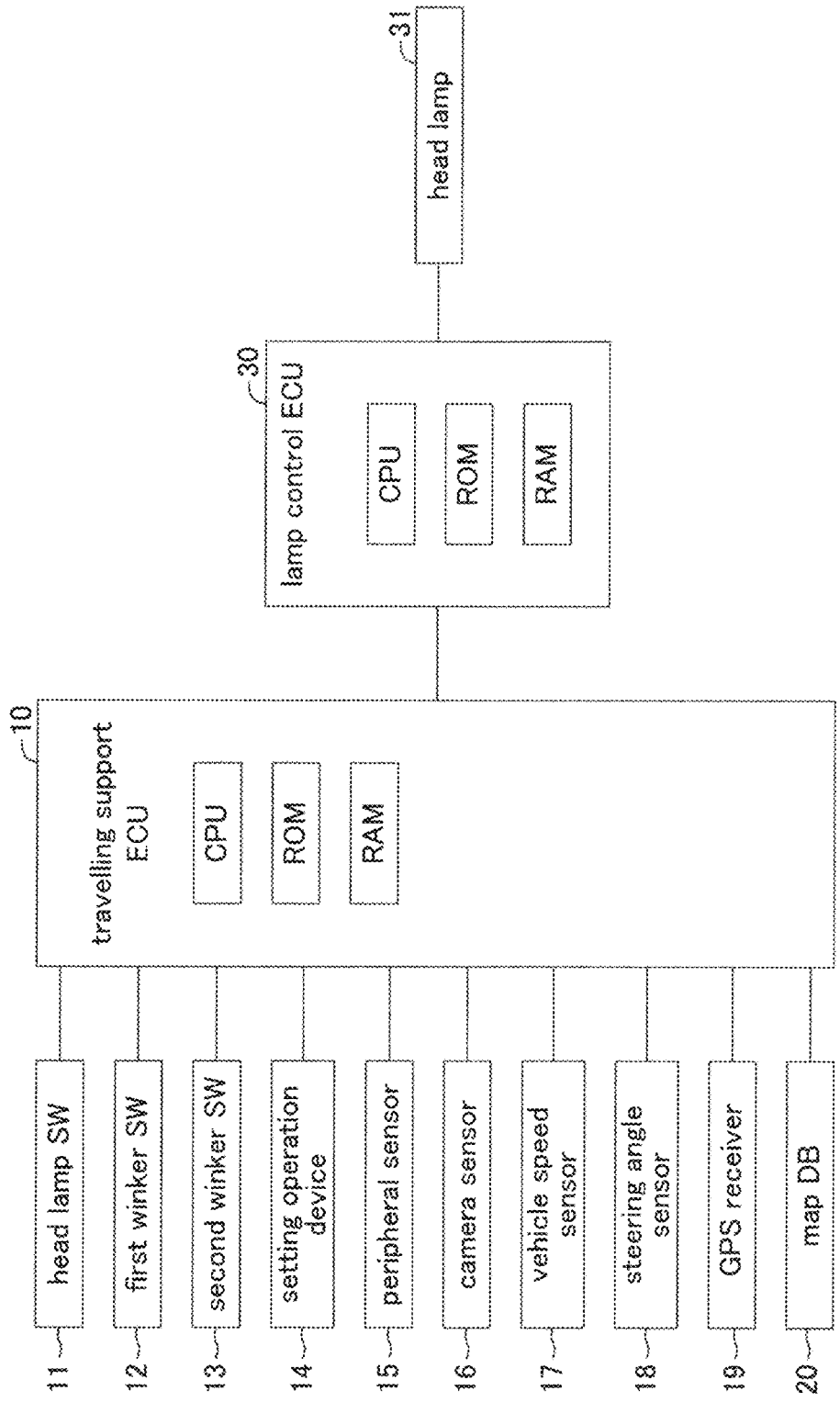
FIG. 1 is a schematic configuration diagram of a light distribution control apparatus for vehicle according to an embodiment of the present disclosure.

The present embodiment apparatus comprises travelling support ECU 10 and lamp control ECU 30 as shown in FIG. 1. The travelling support ECU 10 is connected to the lamp control ECU 30 in such a manner that they can mutually exchange data (communicate) via a communication/sensor type of CAN (Controller Area Network). Hereinafter, the travelling support ECU 10 and the lamp control ECU 30 will be simply referred to as "ECU 10" and "ECU 30", respectively.

ECU is an abbreviation of Electric Control Unit. The ECU 10 and the ECU 30 are electronic control circuits, each of which comprising a microcomputer including CPU, ROM, RAM, and the like. The CPU realizes/performs various functions (mentioned later) by executing instructions (i.e. routines) stored in the ROM.

The ECU 10 is connected to switches 11 to 14 and sensors 15 to 18 listed in the following, and obtains (acquires) signals generated by these switches and information including signals detected by these sensors (i.e., detected values) every time predetermined time elapses.

The head lamp switch 11 is a switch to switch on and off of the head lamp 31 and is operated by the driver. When the head lamp switch 11 is changed from an off position to an on position, thereafter, the head lamp switch 11 maintains the on position until the head lamp switch 11 is again changed from the on position to the off position. When the head lamp switch 11 is in the on position, the head lamp switch 11 generates an on signal for lighting the head lamp 31. When the head lamp switch 11 is changed from the on position to the off position, thereafter, the head lamp switch 11 maintains the off position until the head lamp switch 11 is again changed from the off position to the on position. When the head lamp switch 11 is in the off position, the head lamp switch 11 generates an off signal for extinguishing the head lamp 31.

Figure 2:
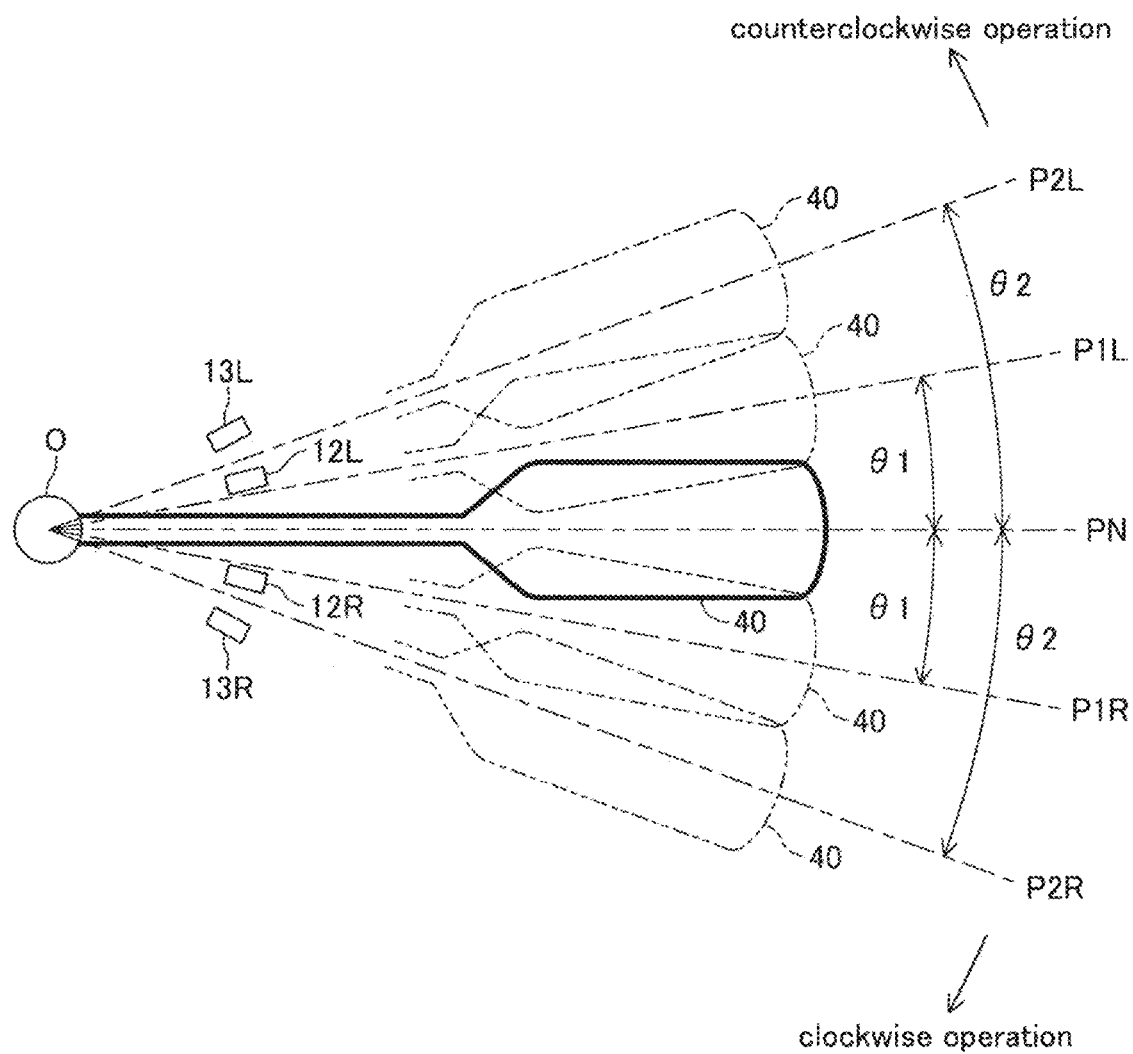
FIG. 2 is a diagram showing an operating method of a winker lever 40.

The first winker switch 12 and the second winker switch 13 are provided at a winker lever 40 (refer to FIG. 2). Specific description on these switches 12, 13 will be made, referring to FIG. 2. The winker lever 40 is arranged at a steering column and is used as an operating device for blinking winkers and as an operating device operated when the driver requests the performance of the lane change assist control. The lane change assist control is known control to monitor surrounding of the own vehicle as well as to support steering operation by the driver so that the own vehicle moves from an own lane to a target lane after being determined that a safe lane change is possible as a result of monitoring the surrounding of the own vehicle (mentioned later). Hereinafter, the lane change assist control will be also referred to as "LCA".

The winker lever 40 is configured to rotate around a spindle O in a counterclockwise operation direction and in a clockwise operation direction, respectively and to be movable to a first stroke position P1L (P1R) and a second stroke position P2L (P2R). Here, the first stroke position P1L (P1R) is a position to which the winker lever 40 has rotated from a neutral position PN by a first angle θ1 and the second stroke position P2L (P2R) is a position to which the winker lever 40 has rotated from a neutral position PN by a second angle θ2 (>θ1).

The winker lever 40 is configured to come back to the neutral position PN when the driver moves the winker lever 40 to the first stroke position P1L (P1R) with the lever 40 held and thereafter releases the lever 40. On the other hand, the winker lever 40 is configured to stay at the second stroke position P2L (P2R) by a locking mechanism when the driver moves the winker lever 40 to the second stroke position P2L (P2R) with the lever 40 held and thereafter releases the lever 40. In addition, the winker lever 40 is configured to come back to the neutral position PN by being unlocked by the locking mechanism in following two cases. That is, the first case is a case where the steering wheel (illustration omitted) is rotated in an opposite direction (that is, rotated in a direction opposite to an operating direction of the lever 40) under a state where the lever 40 is positioned at the second stroke position P2L (P2R), or when the driver operates the lever 40 in such a manner that the lever 40 is brought back toward the neutral position.

The first winker switch 12 comprises a left-side first winker switch 12L and a right-side first winker switch 12R. These switch 12L and switch 12R are turned on only when the winker lever 40 is positioned at the first stroke position P1L and the first stroke position P1R, respectively. When either switch 12L or 12R is turned on, an on signal is output to the ECU 10 during a corresponding switch being turned on.

When the ECU 10 has continuously received the on signal from the switch 12L for more than or equal to a predetermined set time (1 second, for example), the ECU 10 receives this on signal as an LCA request signal requesting the performance of the LCA. This LCA request signal includes information indicating that a lane change direction is toward left with respect to the own lane. When the ECU 10 has continuously received the on signal from the switch 12R for more than or equal to the set time, the ECU 10 receives this on signal as the LCA request signal. This LCA request signal includes information indicating that the lane change direction is toward right with respect to the own lane. When the ECU 10 receives the LCA request signal from the switch 12L, the ECU 10 blinks winkers (illustration omitted), each of which being provided at a front left end part and a rear left end part of the vehicle. When the ECU 10 receives the LCA request signal from the switch 12R, the ECU 10 blinks winkers (illustration omitted), each of which being provided at a front right end part and a rear right end part of the vehicle (refer to FIG. 6B, FIG. 7A, and FIG. 7B).

Therefore, when the driver requests the performance of the LCA, all that the driver needs to do is to move the winker lever 40 to either the first stroke position P1L or the first stroke position P1R corresponding to the lane change direction and thereafter maintains this state (that is, holds the lever 40) for more than or equal to the set time.

The second winker switch 13 comprises a left-side first winker switch 13L and a right-side first winker switch 13R. These switch 13L and switch 13R generate on signal only when the winker lever 40 is positioned at the second stroke position P2L and the second stroke position P2R, respectively. When the ECU 10 receives the on signal from the switch 13L, the ECU 10 blinks the winkers at the front left end part and the rear left end part of the vehicle. When the ECU 10 receives the on signal from the switch 13R, the ECU 10 blinks the winkers at the front right end part and the rear right end part of the vehicle (refer to FIG. 6B, FIG. 7A, and FIG. 7B).

Therefore, when the driver attempts to perform the lane change by his/her own driving operation, the driver moves the winker lever 40 to either the second stroke position P2L or the second stroke position P2R corresponding to the lane change direction. Alternatively, when the driver attempts to turn the vehicle left or right, the driver moves the winker lever 40 to either the second stroke position P2L or the second stroke position P2R corresponding to a turning direction.

The setting operation device 14 shown in FIG. 1 is an operation device for setting whether or not to permit the performance of the LCA (and for setting parameters necessary for the control) and is operated by the driver. When an operation to permit the performance of the LCA is conducted to the setting operation device 14, the setting operation device 14 generates an LCA permission signal until an operation not to permit the performance of the LCA is conducted to the setting operation device 14. When the operation not to permit the performance of the LCA is conducted to the setting operation device 14, the setting operation device 14 generates an LCA non-permission signal until the operation to permit the performance of the LCA is conducted to the setting operation device 14. When having received the LCA permission signal, the ECU 10 determines that the performance of the LCA is permitted and when having received the LCA non-permission signal, the ECU 10 determines that the performance of the LCA is not permitted.

The peripheral sensor 15 comprises a plurality of radar sensors. Each of the plurality of radar sensors detects an object (an other vehicle, a pedestrian, and the like, for example) present in a front region, a front-right region, a front-left region, a rear-right region, and a rear-left region of the own vehicle. Each radar sensor is known, and for example, each radar sensor uses an electric wave in a millimeter waveband to obtain information indicating a distance between the own vehicle and the object, a relative speed of the object with respect to the own vehicle, a relative direction of the object with respect to the own vehicle, and so on.

The camera sensor 16 comprises a camera part to image a scenery in front of the own vehicle with visible light and a data analyzing part to analyze image data obtained by the camera part.

The data analyzing part recognizes a carriageway marking line of a road (hereinafter, also referred to as a "white line"

for convenience sake) and a lane which is a region divided by the white lines. In addition, the data analyzing part obtains a relative position of the own vehicle with respect to the lane. Further, the data analyzing part obtains information on the white lines such as types of the white lines (a solid line or a dashed line) of the own lane and an adjacent lane, a distance between adjacent left and right white lines (i.e., a lane width), a shape of each of the white lines (a curvature of the white line, for example), and so on.

The data analyzing part obtains information on an object present in front of the own vehicle (the information such as the distance between the own vehicle and the object, the relative speed of the object with respect to the own vehicle, the relative direction of the object with respect to the own vehicle, and so on). The ECU 10 synthesizes the information obtained by the peripheral sensor 15 and the information obtained by the camera sensor 16 to determine information on an object present around the own vehicle.

The vehicle speed sensor 17 detects a travelling speed of the own vehicle (vehicle speed) V.

The steering angle sensor 18 detects a steering angle of the steering wheel.

In addition, the ECU 10 is connected to a GPS receiver 19 to receive a GPS signal and a map database 20. The ECU 10 identifies a position (a latitude and a longitude) of the own vehicle at a current timing based on the GPS signal transmitted from the GPS receiver 19 every time the predetermined time elapses.

The map information stored in the map database 20 includes road information. The road information include types of a road (for example, an interurban expressway, an urban expressway, and a general road) and parameters indicating a position and a shape of a road (for example, a curvature radius or a curvature of a road, a lane width of a road, the number of lanes, a position of a center line of each lane, and the like).

The ECU 30 is connected to the head lamp (an irradiating apparatus) 31. The ECU 30 controls light distribution of the head lamp 31 based on light distribution control instruction transmitted from the ECU 10. Controlling the light distribution of the head lamp 31 means controlling at least one of a lighting region which is a region lightened by the head lamp 31 and illuminance in this lighting region.

Figure 4A:
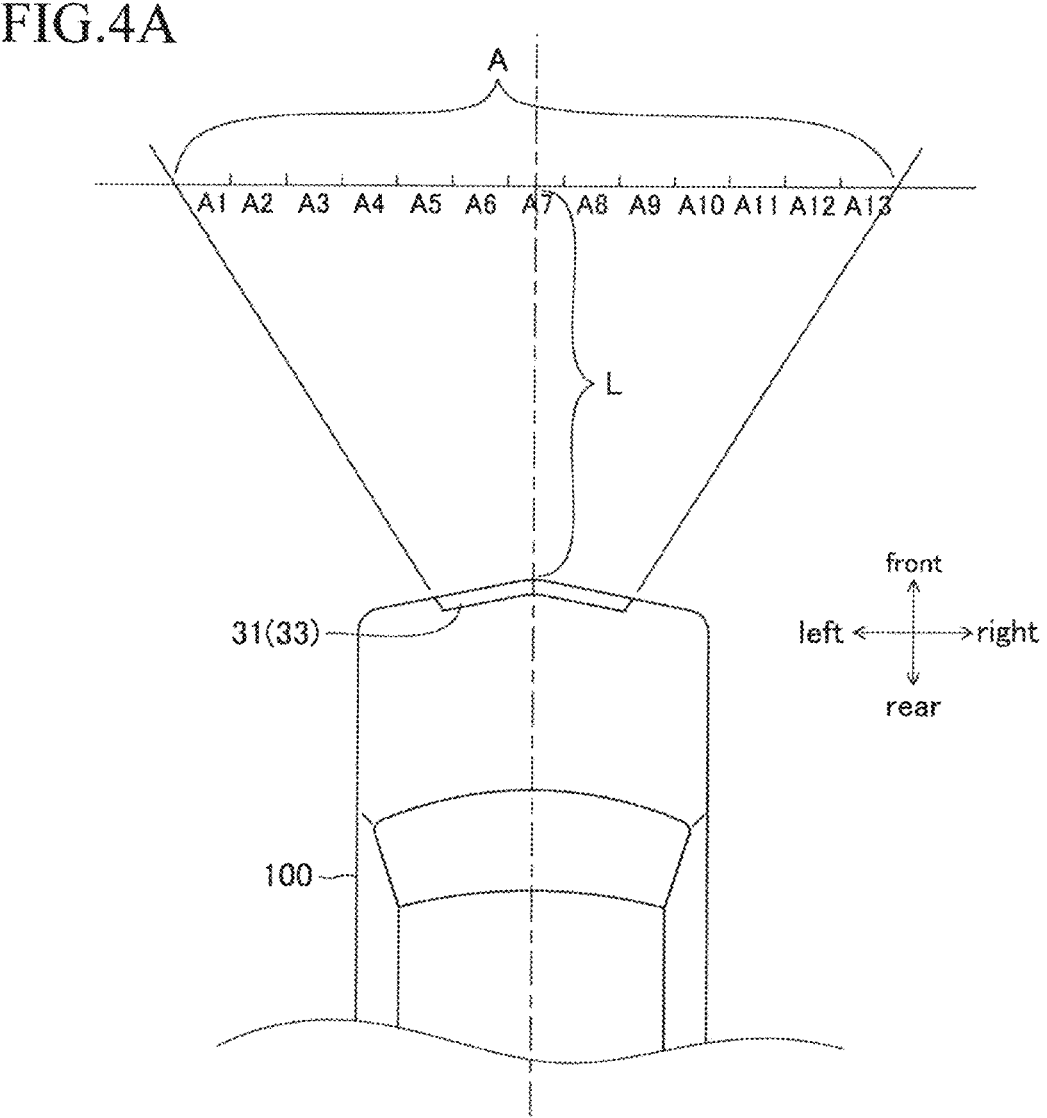
FIG. 4A is a plan view schematically showing an irradiation region in a vehicle width direction of each LED.

The head lamp 31 is provided at center front end part of the own vehicle (refer to FIG. 4A). The head lamp 31 is a travelling-use headlight realizing a so-called "high-beam", and is configured to be capable of irradiate light in front of the own vehicle. Since the present embodiment apparatus is an apparatus to control the light distribution of the high-beam, an illustration of a passing-use headlight realizing a so-called "low-beam" is omitted in the present embodiment.

Figure 3:
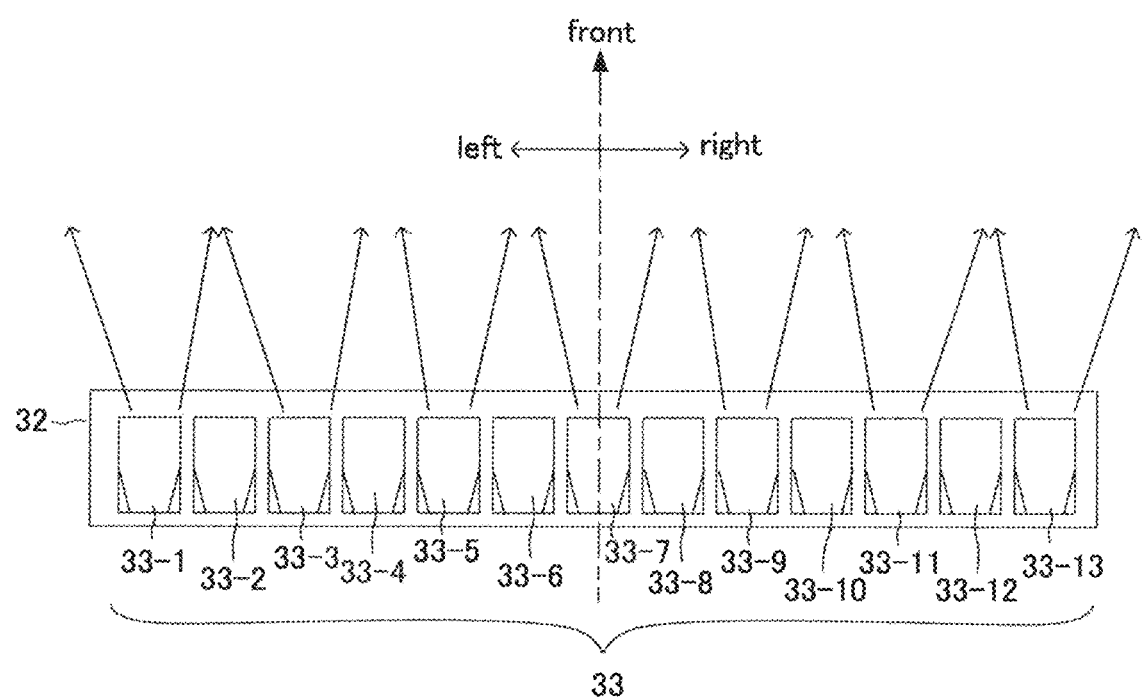
FIG. 3 is a diagram schematically showing a configuration of LED array of a head lamp.

As shown in FIG. 3, the head lamp 31 is a head lamp using an LED array 32 as a light source. The LED array 32 includes a group of LEDs 33 (33-1 to 33-13). The group of LEDs 33 are arranged in a row in a left-right direction (i.e. a vehicle width direction) at a predetermined interval. The ECU 30 controls turning on and off of the group of LEDs 33 and current values supplied for the group of LEDs 33 independently for each LED 33-1 to 33-13. When the group of LEDs 33 is controlled to be turned on by the ECU 30, the group of LEDs 33 irradiate light to the front. Hereinafter, a travelling direction of the own vehicle (that is, a front direction of the vehicle) will be also simply referred to as a "travelling direction" or a "to the front". It should be noted that the number of LEDs is not limited thereto, but a desired number may be adopted based on the irradiation region, light intensity, power consumption, and so on.

Figure 4B:
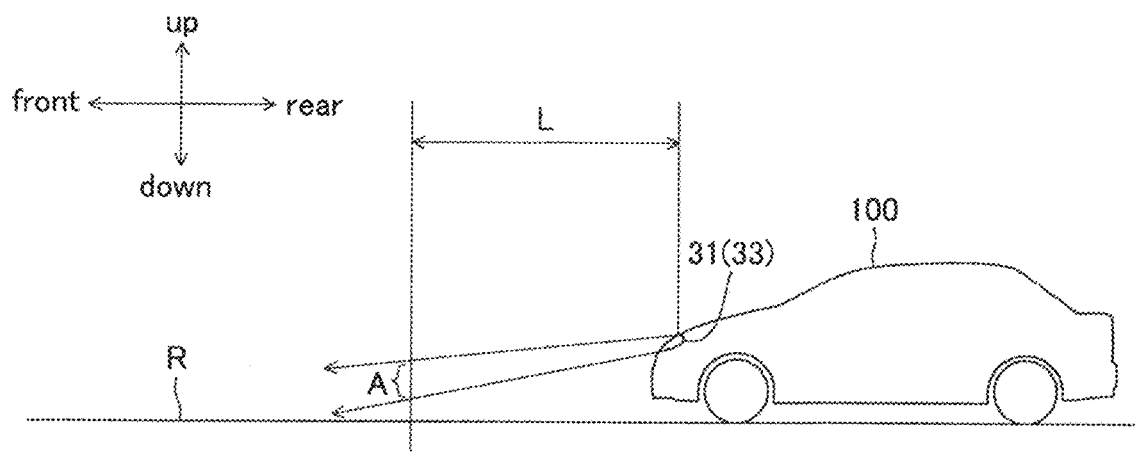
FIG. 4B is a side view schematically showing an irradiation region in a vertical direction of a group of LEDs.

FIG. 4A and FIG. 4B are a plan view and a side view, respectively, schematically showing a region to which the light from the group of LEDs 33 is irradiated (the irradiation region). Both of them show a relative position of an irradiation region A with respect to an own vehicle 100. As shown in FIGS. 4A and 4B, the irradiation region A is a plane expanding in the left-right direction and an up-down direction, and is apart from the own vehicle 100 to the front by a predetermined distance L. It should be noted that the left-right direction means the vehicle width direction and the up-down direction means a direction perpendicular to a road surface R (refer to FIG. 4B) on which the own vehicle 100 is grounded. As shown in FIG. 4B, the light irradiated from the group of LEDs 33 penetrates the irradiation region A to reach the road surface. Therefore, the irradiation region A is positioned upward from the road surface R by a predetermined distance.

The irradiation region A is a substantially rectangular shape and as shown in FIG. 4A, includes regions A1 to A13. The regions A1 to A13 are regions composed by dividing the irradiation region A into 13 regions. The regions A1 to A3 are arranged in order of a region A1, a region A2, . . . , a region A12, and a region A13 from the left. Lengths in the left-right direction of the regions A1 to A13 are equal to each other. That is, the regions A1 to A13 are congruent with each other. The light irradiated from each LED 33-1 to 33-13 is irradiated to each region A1 to A13 (in other words, penetrates each region A1 to A13). When the light irradiated to each region A1 to A13 reaches the road surface and the driver perceives light reflected on the road surface, the driver recognizes that the road surface is lighten. Hereinafter, a region recognized by the driver that the road surface is lighten will be referred to as a "lighting region". Intensity of the light irradiated from each LED 33-1 to 33-13 becomes higher as the current value supplied for each LED 33-1 to 33-13 increases. Besides, as the intensity of the light irradiated from each LED 33-1 to 33-13 becomes high, the driver perceives the reflected light from the road surface at a farther position. That is, the lighting region becomes longer in the travelling direction. It should be noted that the present embodiment assumes a situation where the own vehicle is travelling on a straight lane at a timing when the request for the lane change has been made. Thus, "The lighting region becomes longer in the travelling direction" is synonym of "The lighting region becomes longer in a lane axis direction".

Therefore, by independently controlling the turning on and off of each LED 33-1 to 33-13, the ECU 30 can control an area in the vehicle width direction of the lighting region. In addition, by independently controlling the current value supplied for each LED 33-1 to 33-13, the ECU 30 can control a length of the lighting region in the travelling direction (a length in the lane axis direction), depending on a position in the vehicle width direction.

When the own vehicle is travelling on a middle lane of a general road with three lanes on each side, the LED 33-1 (an LED arranged at a left most end among the group of LEDs 33) is configured in such a manner that the irradiation light thereof penetrates the region A1 to be capable of reaching a region located on a left side of a left-side white line of a left lane (that is, a white line positioned at a farther side from the own vehicle 100 among a pair of white lines forming the left lane). Similarly, the LED 33-13 (an LED arranged at a right most end among the group of LEDs 33) is configured in such a manner that the irradiation light thereof penetrates the region A13 to be capable of reaching a region located on a right side of a right-side white line of a right lane (that is, a white line positioned at a farther side from the own vehicle 100 among a pair of white lines forming the right lane).

Figure 5A:
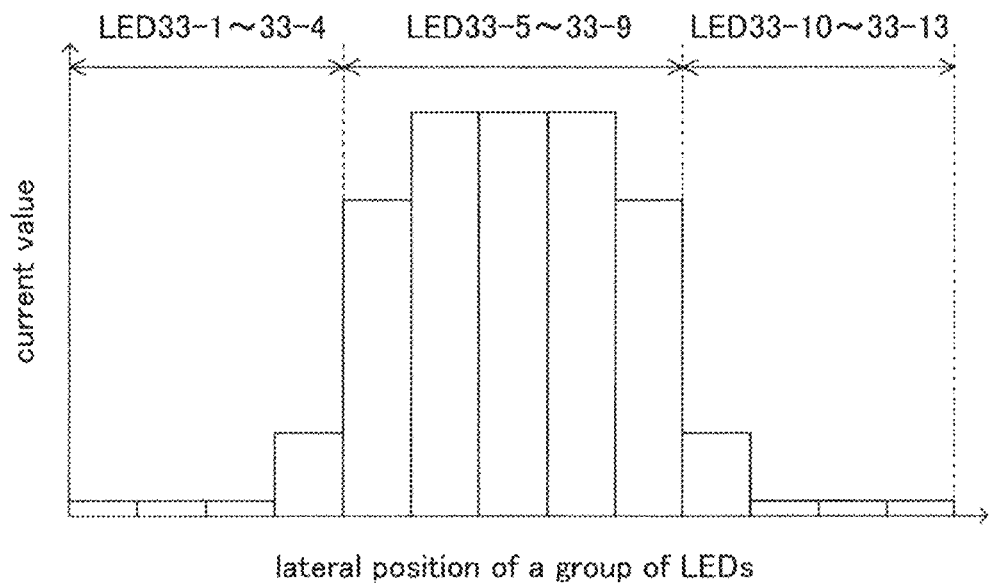
FIG. 5A is a diagram showing distribution of current value supplied for the group of LEDs when light distribution change control is not being performed.
Figure 5B:
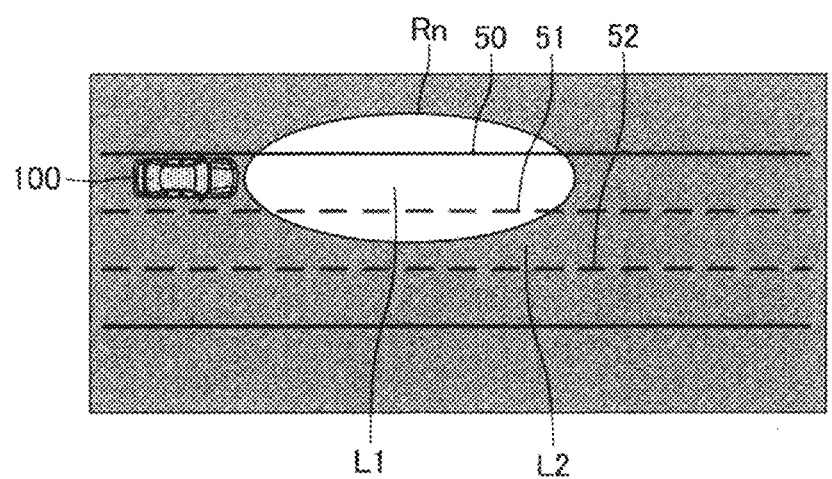
FIG. 5B is a diagram showing a lighting region when the light distribution change control is not being performed.

FIG. 5A is a bar graph regulating a relationship between a lateral position of each of the group of LEDs 33 and a current value supplied for each LED 33-1 to 33-13. A left most bar indicates the current value supplied for the LED 33-1 and a right most bar indicates the current value supplied for the LED 33-13. FIG. 5B is a diagram showing a lighting region Rn (a first region) in a case where the own vehicle 100 is continuously travelling on a lane L1. In an example of FIG. 5B, the lighting region Rn shows a region in a case when the current is supplied for the head lamp 31 in accordance with the current value distribution in FIG. 5A. It should be noted that the lane L1 is a left lane of a road with three lanes on each side. The same thing can be said to the following FIG. 6B, FIG. 7A, and FIG. 7B.

According to FIG. 5A, relatively high current is supplied for the LED 33-5 to 33-9 arranged at a substantially center of the group of LEDs 33, and few current is supplied for the LED 33-1 to 33-4 and the LED 33-10 to 33-13 arranged at a left side and a right side of the group of LEDs 33.

As a result, as shown in FIG. 5B, the lighting region Rn has a relatively elongated shape in the travelling direction. The lighting region Rn includes the own lane L1 and a pair of white lines 50, 51 forming the own lane L1 (that is, a front region of the own vehicle 100) whereas does not include "an area including a white line at a farther side from the own vehicle 100 among a pair of the white lines forming a lane adjacent to the own lane L1 at a left side thereof" and "an area including a white line at a farther side from the own vehicle 100 among a pair of the white lines forming a lane adjacent to the own lane L1 at a right side thereof". For example, the lighting region Rn does not include "an area including a white line 52 at a farther side from the own vehicle 100 among a pair of the white lines 51, 52 forming a lane L2 adjacent to the own lane L1 at a right side thereof". It should be noted that hereinafter, "a pair of white lines forming the own lane" will be simply referred to as "white lines at both sides of the own lane" or "left and right white lines of the own lane".

That is, when the own vehicle 100 is continuously travelling on the same lane L1, the ECU 10 controls the turning on and off of the group of LEDs 33 as well as the current values thereof in such a manner that "the lighting region Rn includes the own lane L1 and the white lines 50, 51 at both sides thereof to a relatively far position". Specifically, the ECU 10 first obtains a lane width of the own lane L1 based on "the GPS signal and the road information included in the map database 20" (hereinafter, simply referred to as "current position road information), and based on the obtained lane width, determines an area of the lighting region Rn in the vehicle width direction and the travelling direction. Thereafter, the ECU 10 determines a group of LEDs capable of lightening this determined lighting region Rn and current values to be supplied for this group of LEDs as well as determines current values (including zero) to be supplied for a rest of a group of LEDs.

It should be noted that the lane width of the own lane L1 may be obtained from the camera sensor 16. That is, when the surrounding of the own vehicle 100 is light enough to be able to image the left and right white lines 50, 51 of the own lane L1, the camera sensor 16 analyzes image data where the left and right white lines 50, 51 have been imaged to obtain the lane width of the own lane L1. According to this configuration, when it becomes dark in the surrounding and thus the head lamp 31 is turned on, the ECU 10 and the ECU 30 control the group of LEDs 33 based on the lane width obtained by the camera sensor 16 and thereby the lighting region Rn can include the own lane L1 and the white lines 50, 51 at both sides thereof to a relatively far position.

In contrast, when the head lamp 31 is turned on under a situation where the lane width of the own lane L1 has not been obtained, the ECU 10 and the ECU 30 first turn on a predetermined range of a group of LEDs among the group of LEDs 33. If the lighting region Rn includes the left and right white lines 50, 51 with this way, the lane width of the own lane L1 is obtained by the camera sensor 16, which therefore enables the ECU 10 and the ECU 30 to control the group of LEDs 33 based on this lane width. On the other hand, if the lighting region Rn of when the predetermined range of the group of LEDs are turned on does not include the left and right white lines 50, 51, the ECU 10 and the ECU 30 control, based on the information obtained by the camera sensor 16, the group of LEDs 33 until the lighting region Rn comes to include the left and right white lines 50, 51 to a relatively far position.

Next, a description on the LCA will be made. Since the LCA is known control, a simple description will be made below (for more detail, refer to Japanese Patent Application Laid-Open (kokai) No. 2016-207060 and Japanese Patent Application Laid-Open (kokai) No. 2017-74823, for example).

The ECU 10 starts the LCA when the LCA starting condition is satisfied. The LCA starting condition becomes satisfied when following conditions are all satisfied, for example.

Condition 1. The ECU 10 has received the LCA request signal.

Condition 2. The ECU 10 has received the LCA permission signal.

Condition 3. A white line (a white line positioned at a boundary between the own lane and the target lane) on a side (direction) of the winker lever 40 being operated (rotated) is a dashed line.

Condition 4. The surrounding of the own vehicle is in a situation where safe lane change is possible.

It should be noted that the LCA starting condition is not limited to the above conditions. For example, a condition that a road is an exclusive road for vehicles may be added. In this case, whether or not this condition is satisfied can be determined by identifying, based on the current position road information, a road type of a road on which the own vehicle is currently travelling.

Here, whether or not the condition 4 is satisfied is determined, based on the information obtained by the peripheral sensor 15 and the camera sensor 16, by determining whether or not there does not exist an object (for example, an other vehicle, a pedestrian, an obstacle, and the like) on the target lane which is likely to interfere with the lane change. Therefore, when the own vehicle 100 is continuously travelling on the same lane L1 at night, the ECU 10 may not be able to properly determine whether or not the condition 4 is satisfied based on the information obtained from the camera sensor 16 and as a result, may not be able to properly determine whether or not the LCA starting condition is satisfied. That is, as stated above, the lighting region Rn of when the own vehicle 100 is travelling on the same lane L1 at night does not include "an area including a white line 52 positioned at a farther side from the own vehicle 100 among a pair of white lines 51, 52 forming the lane L2". Therefore, in a case where the LCA request signal includes the information that the lane change direction is toward right, the target lane L2 may not be sufficiently lightened, which makes it impossible to properly determine whether or not there does not exist an object on the target lane L2 which is likely to interfere with the lane change, and thus it is highly likely not to be able to properly determine whether or not the condition 4 is satisfied and further whether or not the LCA starting condition is satisfied. The same thing can be said to a case where the LCA request signal includes the information that the lane change direction is toward left.

Therefore, when the ECU 10 determines that the condition 2 and the condition 3 have been satisfied in a case when the ECU 10 received the LCA request signal while the own vehicle 100 is continuously travelling on the same lane L1 at night and thus determined that the condition 1 was satisfied, the ECU 10 conducts an operation to change the light distribution of the head lamp 31 (that is, the lighting region and the current values to be supplied for the group of LEDs) and transmits to the ECU 30, based on the calculation result, a performing instruction of control to change the light distribution (light distribution change control). The ECU 30 controls the head lamp 31 based on the performing instruction and thereby performs the light distribution change control.

Figure 6A:
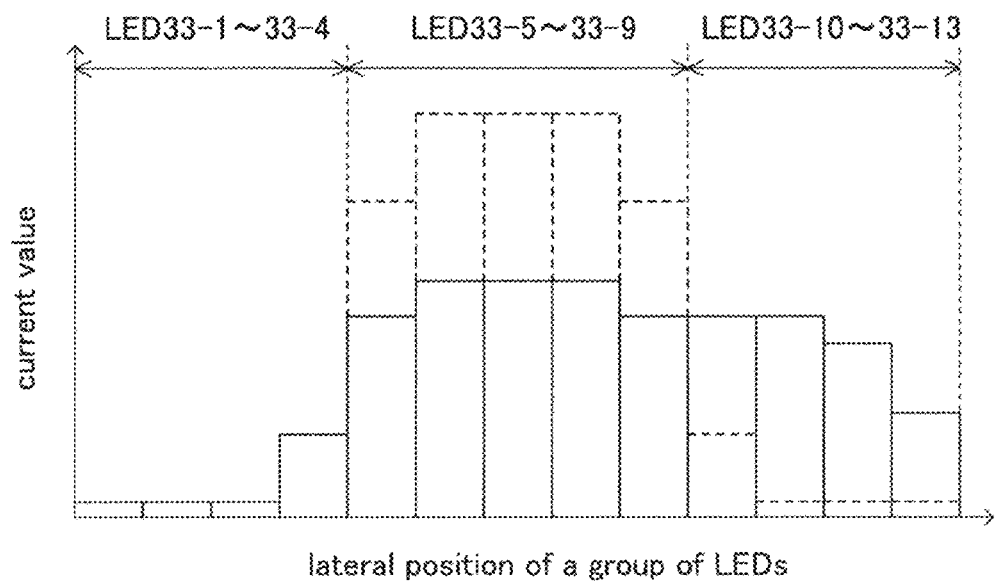
FIG. 6A is a diagram showing distribution of current value supplied for the group of LEDs when light distribution change control is being performed.
Figure 6B:
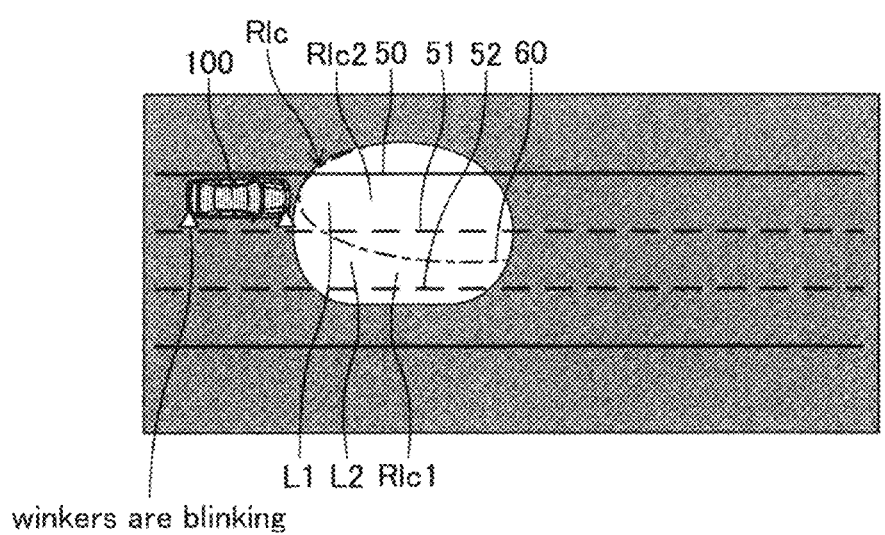
FIG. 6B is a diagram showing a lighting region when the light distribution change control is being performed.

A description on the light distribution change control will be made, referring to FIG. 6A and FIG. 6B. FIG. 6A is a graph corresponding to FIG. 5A and is a bar graph regulating a relationship between a lateral position of each of the group of LEDs 33 and a current value supplied for each LED 33-1 to 33-13 while the light distribution change control is being performed. In FIG. 6A, the current values of when the light distribution change control is not being performed (that is, the current values shown in FIG. 5A) are shown in a dashed line. FIG. 6B is a diagram corresponding to FIG. 5B and shows a lighting region Rlc (a second region) of when the light distribution change control is being performed in a case when the own vehicle 100 is travelling on the lane L1. In an example of FIG. 6B, the lighting region Rlc shows a region in a case when the current is supplied for the head lamp 31 in accordance with the current value distribution in FIG. 6A. In addition, in this example, the LCA from the own lane L1 to the target lane (the right lane) L2 is being requested. Therefore, the winkers at the front right end part and the rear right end part are blinking when the light distribution change control is being performed (refer to FIG. 6B). It should be noted that in FIG. 6B, an outline of the lighting region Rn of when the light distribution change control is not being performed is shown with one dot chain line 60. The same thing can be said to the following FIG. 7A and FIG. 7B.

According to FIG. 6A, comparing with a case where the light distribution change control is not being performed, the current supplied for the LEDs 33-5 to 33-9 is decreased and the current supplied for the LEDs 33-10 to 33-13 (that is, a group of LEDs at a lane change direction side with respect to the LEDs 33-5 to 33-9) is increased, whereas the current supplied for the LEDs 33-1 to 33-4 is maintained. Note that the current value supplied for the LEDs 33-10 to 33-13 when the light distribution change control is being performed is controlled to be smaller than the current value supplied for the LEDs 33-5 to 33-9 when the light distribution change control is not being performed.

As a result, as shown in FIG. 6B, the lighting region Rlc has, comparing with the lighting region Rn, a shape shortened in a length in the travelling direction (a length in the lane axis direction) as well as widened (broadened) toward the lane change direction side. In other words, the lighting region Rlc includes a region Rlc1 (a region-at-a-lane-change-side) positioned at the target lane side with respect to the lighting region Rn (refer to FIG. 5B) and a region Rlc2 (a reduced region) which is a region where the lighting region Rn is reduced to a region near the own vehicle 100. Specifically, the lighting region Rlc includes the own lane L1 and the white lines 50, 51 at both sides thereof as well as the target lane L2 and the white lines 51, 52 at both sides thereof. Besides, illuminance in the region Rlc2 is equal to or less than or equal to illuminance in a region among the lighting region Rn, the region corresponding to the region Rlc2 (that is, a part of the lighting region Rn when the light distribution change control is not being performed). It should be noted that the region Rlc1 is a region positioned at the target lane side among regions defined by an outline of the lighting region Rlc and the one dot chain line 60 and the region Rlc2 is a region positioned at the own lane side among the regions defined by an outline of the lighting region Rlc and the one dot chain line 60.

That is, when executing calculation to change the light distribution, the ECU 10 controls turning on and off of the group of LEDs 33 and the current values in such a manner that "the lighting region Rlc shortens in the travelling direction as well as newly includes the target lane L2 and the white line 52 which is a white line at a farther side from the own vehicle 100 among the white lines 51, 52 at both sides of the target lane L2". Specifically, the ECU 10 first obtains a lane width of the target lane L2 based on the current position road information. Next, the ECU 10 determines, based on the obtained lane width, a widened region (the region Rlc1) at the lane change direction side as well as a reduced region (the region Rlc2) where the lighting region Rn is reduced in the travelling direction, and thereby determines the lighting region Rlc. Thereafter, the ECU 10 determines a group of LEDs capable of lighting the determined lighting region Rlc and current values supplied for this group of LEDs as well as determines current values (including a zero value) supplied for a rest of a group of LEDs. It should be noted that in the example of FIG. 6A, the current values of all of the LEDs 33-10 to 33-13 are increased. However, a configuration is not limited thereto. Depending on the lane width of the target lane L2, this group of LEDs may include one or more LEDs, current value thereof not being increased.

The lane width of the target lane L2 may be obtained from the camera sensor 16. That is, when the surrounding of the own vehicle 100 is light enough to be able to image the left and right white lines 51, 52 of the target lane L2, the camera sensor 16 analyzes image data where the left and right white lines 51, 52 have been imaged to obtain the lane width of the target lane L2. According to this configuration, when it becomes dark in the surrounding and thus the head lamp 31 is turned on, the ECU 10 and the ECU 30 control the group of LEDs 33 based on the lane width obtained by the camera sensor 16, which thereby enables the lighting region Rlc to shorten in the travelling direction compared with the lighting region Rn as well as to newly include the target lane L2 and the white line 52.

In contrast, when the head lamp 31 is turned on under a situation where the lane width of the target lane L2 has not been obtained, the ECU 10 and the ECU 30 first turn on a predetermined range of a group of LEDs among the group of LEDs 33. If the lighting region includes the left and right white lines 51, 52 with this way, the lane width of the target lane L2 is obtained by the camera sensor 16, which therefore enables the ECU 10 and the ECU 30 to control the group of LEDs 33 based on this lane width. On the other hand, if the lighting region of when the predetermined range of the group of LEDs are turned on does not include at least one of the left and right white lines 51, 52, the ECU 10 and the ECU 30 control, based on the information obtained by the camera sensor 16, the group of LEDs 33 until the lighting region comes to include the left and right white lines 51, 52.

When having received LCA request signal including the information that the lane change direction is toward left, the ECU 10 has the ECU 30 control the group of LEDs 33 with a similar manner as stated above. Thereby, the lighting region has a shape with a region symmetric to the lighting region Rlc with respect to a front-rear axis of the own vehicle 100.

As described above, the light distribution change control is performed upon receiving the LCA request signal (strictly, further upon satisfying the condition 2 and the condition 3), which enables the camera sensor 16 to accurately obtain the information on whether or not an object is present on the target lane and when the object is present, also the information on this object. Therefore, the ECU 10 can properly determine whether or not there does not exist an object on the target lane L2 which is likely to interfere with the lane change, which makes it possible to properly determine whether or not the condition 4 is satisfied. As a result, whether or not the LCA starting condition is satisfied can be properly determined.

As mentioned above, the length of the lighting region Rlc in the travelling direction is shorter than the length of the lighting region Rn in the travelling direction. However, during the light distribution change control being performed, the own vehicle is about to perform the LCA or has been performing the LCA, and therefore, it is not quite necessary to lighten the lane L1 to a far position. Hence, a possibility to make the travelling inconvenient due to the length of the lighting region Rlc in the travelling direction being shortened compared with the lighting region Rn is extremely low. Rather, by controlling the lighting region in this way, a degree of increase in power consumption of the head lamp 31 due to widening the lighting region to the lane change direction side can be suppressed.

When performing the LCA, the ECU 10 calculates a target trajectory function and supports the driver with his/her steering operation in such a manner that the own vehicle 100 moves along with the target trajectory determined by this function. Parameters used for the calculation of the target trajectory function are the vehicle speed V and the lane width of the target lane L2. That is, a shape of the target trajectory varies, depending on the vehicle speed V and the lane width of the target lane L2. Therefore, when executing the calculation to change the light distribution, the ECU 10 changes the lighting region depending on the vehicle speed V and the lane width of the target lane L2 so that the lighting region includes the target trajectory.

Figure 7A:
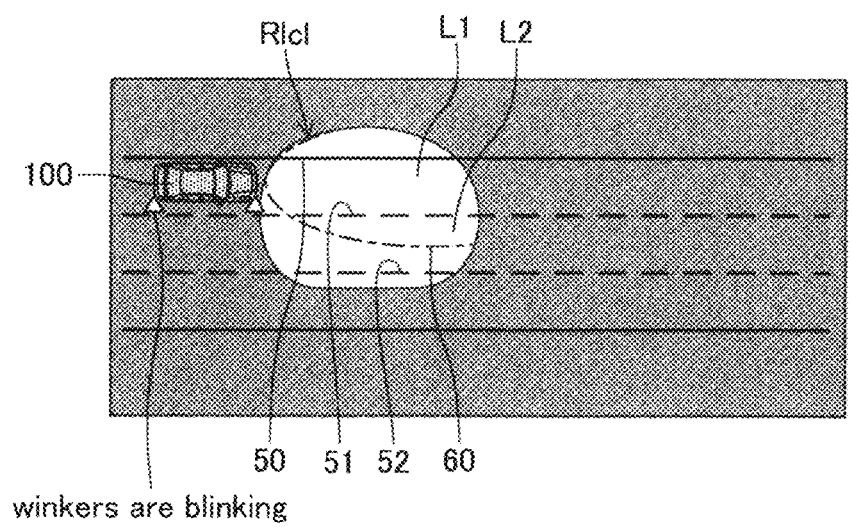
FIG. 7A is a diagram showing a lighting region when the light distribution change control is being performed at a vehicle speed V1.
Figure 7B:
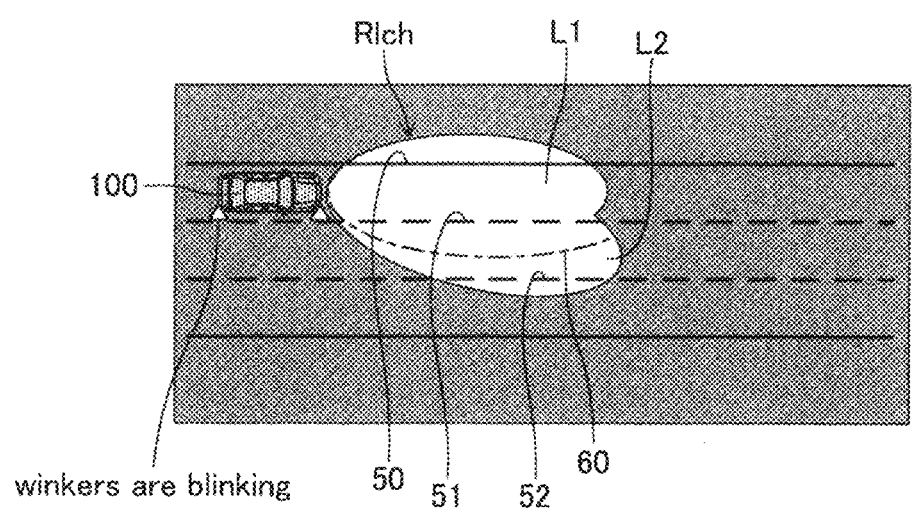
FIG. 7B is a diagram showing a lighting region when the light distribution change control is being performed at a vehicle speed V2 (>V1).

A specific description will be made, referring to FIG. 7A and FIG. 7B. FIG. 7A and FIG. 7B shows a situation where the light distribution change control is being performed upon receiving the LCA request signal toward the target lane L2 (that is, toward a right side) while the own vehicle 100 is travelling on the left lane L1. The vehicle speed V2 of the own vehicle 100 in FIG. 7B is larger than the vehicle speed V1 of the own vehicle 100 in FIG. 7A. The ECU 10 obtains the vehicle speed V from the vehicle speed sensor 17 as well as acquires the lane width of the target lane L2 based on the current position road information. Thereafter, the ECU 10 calculates, based on the vehicle speed V and the lane width obtained, the target trajectory function to determine the target trajectory and transmits to the ECU 30 the control instruction to control the group of LEDs 33 so that the lighting region Rlc includes this target trajectory.

A shape of the target trajectory becomes longer in the travelling direction as the vehicle speed V increases. Therefore, as the vehicle speed V increases, the ECU 10 transmits to the ECU 30 an instruction to increase the current values supplied for the LEDs 33-10 to 33-13 and the LEDs 33-5 to 33-9, respectively. As a result, as shown in FIG. 7A and FIG. 7B, lengths of the lighting region Rlch at a vehicle speed V2 (a length of the own lane L1 and a length of the target lane L2 in the lane axis direction) become longer than lengths of the lighting region Rlcl at a vehicle speed V1. According to this configuration, it becomes possible for the lighting region Rlc to properly include the target trajectory at any vehicle speed (However, this speed should be in a vehicle speed range where the performance of the LCA is permitted). It should be noted that the ECU 10 is configured to calculate, at any vehicle speed, current values in such a manner that power consumption of the head lamp 31 of when the light distribution change control is being performed becomes less than or equal to power consumption of when this control is not being performed. However, a configuration where the power consumption of the head lamp 31 of when the light distribution change control is being performed exceeds the power consumption of when this control is not being performed may be adopted. Even though such a configuration is adopted, since average light intensity irradiated by the LEDs 33-5 to 33-9 is reduced when the light distribution change control is being performed, a degree of the increase in the power consumption can be suppressed by an amount of the reduced average light intensity.

The ECU 10 terminates the light distribution change control when a terminating condition becomes satisfied. When the condition 4 becomes satisfied while the light distribution change control is being performed and subsequently the LCA starting condition becomes satisfied, a magnitude of the steering angle gradually increases and thereafter gradually decreases. At a timing when the magnitude of the steering angle starts to decrease, it is highly likely that the lane change is substantially terminated. That is, the ECU 10 determines that the terminating condition becomes satisfied when such a change in the magnitude of the steering angle is detected after the LCA is started. Alternatively, the ECU 10 may determine that the terminating condition becomes satisfied at a timing when the own vehicle reaches inside of the target lane. On the other hand, when the condition 4 does not become satisfied while the light distribution change control is being performed and thereby the LCA starting condition does not become satisfied, the LCA will not be performed. In a case when the LCA is not performed, the light distribution change control is unnecessary. Therefore, when a condition that "the LCA starting condition does not become satisfied within a predetermined time after the light distribution change control is started" becomes satisfied, the ECU 10 judges that it is impossible to properly perform the LCA and determines that the terminating condition becomes satisfied.

When the terminating condition becomes satisfied, the ECU 10 transmits to the ECU 30 terminating instruction of the light distribution change control. The ECU 30 controls the head lamp 31 based on this terminating instruction to terminate the light distribution change control. After the light distribution change control is terminated, the head lamp 31 is controlled in accordance with the current value distribution shown in FIG. 5A. Therefore, the lighting region includes the own lane L1 and the white lines 50, 51 at both sides thereof to a relatively far position. It should be noted that a length of the lighting region in the travelling direction may become longer as the vehicle speed V increases even when the light distribution change control is not being performed.

(Specific Operation)

Next, a description on a specific operation of the ECU 10 will be made. The CPU of the ECU 10 performs routines shown by flowcharts in FIG. 8 and FIG. 9 every time a predetermined time elapses.

Figure 8:
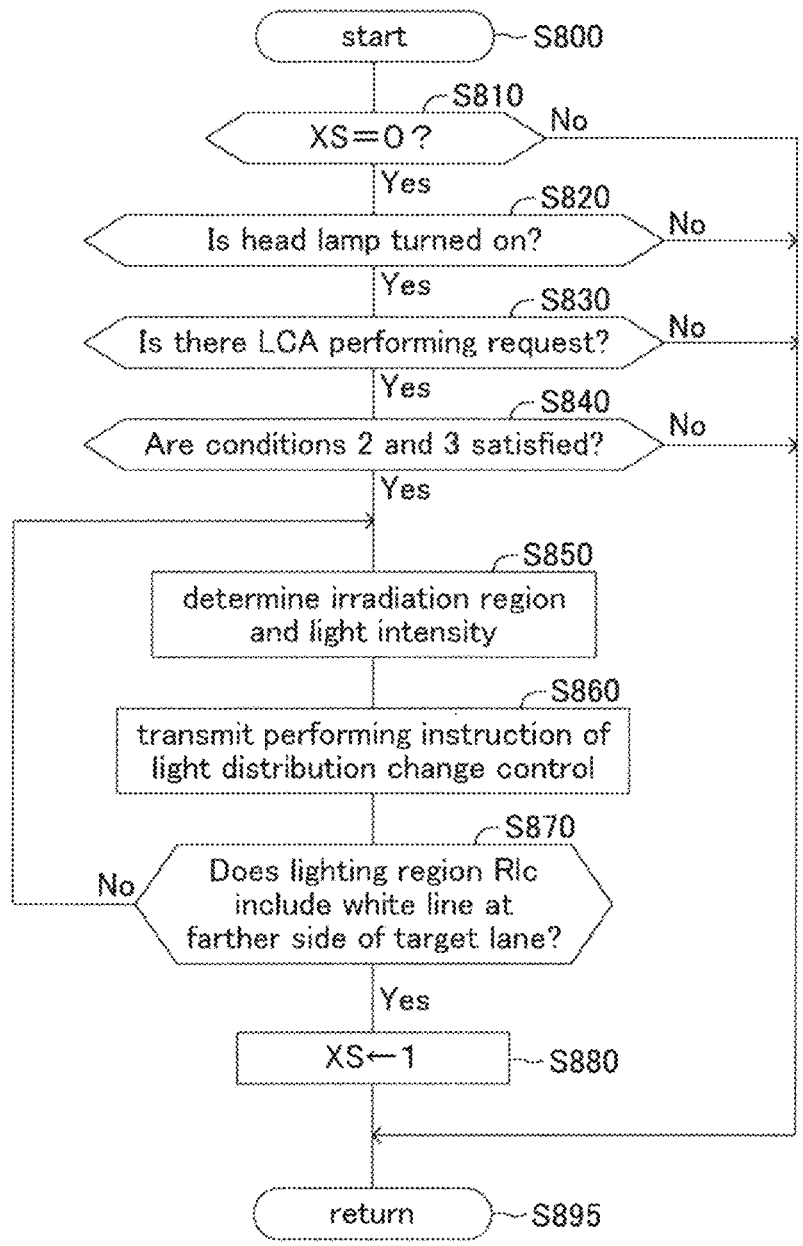
FIG. 8 is a flowchart showing a routine executed by CPU of ECU 10 shown in FIG. 1.

When a predetermined timing arrives, the CPU initiates processing from a step 800 in FIG. 8 and proceeds to a step 810 to determine whether or not a value of a flag XS is "0". The flag XS is a flag to indicate whether or not the light distribution change control is being properly performed. When the light distribution change control is being properly performed, a value of the flag XS becomes "1". When the light distribution change control is not being performed or when the light distribution is inappropriate even though this control is being performed (for example, when the lighting region Rlc does not include the white line 52 at the right side of the target lane L2), a value of the flag XS becomes "0". When the value of the flag XS is "1", the CPU makes a "No" determination at the step 810 to proceed to a step 895 to tentatively terminate the present routine. On the other hand, when the value of the flag XS is "0", the CPU makes an "Yes" determination at the step 810 to proceed to a step 820. It should be noted that when the ignition switch is turned off, a value of the flag XS is initialized to "0".

At the step 820, the CPU determines, based on the signal transmitted from the head lamp switch 11, whether or not the head lamp 31 (the high-beam) is turned on. When the transmitted signal is the off signal (that is, the head lamp 31 is turned off), the CPU makes a "No" determination at the step 820 and proceeds to the step 895 to tentatively terminate the present routine. On the other hand, when the transmitted signal is the on signal (that is, the head lamp 31 is turned on), the CPU makes an "Yes" determination at the step 820 to proceed to a step 830.

At the step 830, the CPU determines, based on the signal transmitted from the first winker switch 12, whether or not the LCA request signal has been received (that is, whether or not there is an LCA performing request). In other words, the CPU determines whether or not the condition 1 included in the LCA starting condition is satisfied. When the LCA request signal has not been received, the CPU makes a "No" determination at the step 830 and proceeds to the step 895 to tentatively terminate the present routine. On the other hand, when the LCA request signal has been received, the CPU makes an "Yes" determination at the step 830 to proceed to a step 840.

At the step 840, the CPU determines whether or not the condition 2 and the condition 3 included in the LCA starting condition are satisfied. Specifically, the CPU determines, based on the signal transmitted from the setting operation device 14, whether or not the LCA permission signal has been received (the condition 2). In addition, the CPU determines, based on the signal transmitted from the first winker switch 12 and the information obtained from the camera sensor 16, whether or not a white line positioned at a boundary of the own lane and the target lane is a dashed line (the condition 3).

When at least one of the condition 2 and the condition 3 is not satisfied, the CPU makes a "No" determination at the step 840 and proceeds to the step 895 to tentatively terminate the present routine. On the other hand, when the condition 2 and the condition 3 are both satisfied, the CPU makes an "Yes" determination at the step 840 and executes processing of a step 850 and a step 860 in order.

At the step 850, the CPU determines, based on the lane width of the target lane L2 obtained based on the current position road information and the vehicle speed V obtained from the vehicle speed sensor 17, the irradiation region and the light intensity (values of the supplied current) of the head lamp 31 of when the light distribution change control is performed.

At the step 860, the CPU transmits to the ECU 30 the performing instruction to perform the light distribution change control with the irradiation region and the light intensity determined at the step 850. The ECU 30 controls the head lamp 31 based on this performing instruction and thereby the light distribution change control is performed (refer to FIG. 6B, FIG. 7A and FIG. 7B). That is, the lighting region is changed from the lighting region Rn to the lighting region Rlc. Thereafter, the CPU proceeds to a step 870.

At the step 870, the CPU determines, based on the information obtained from the camera sensor 16, whether or not the lighting region Rlc includes the white line 52 at a farther side from the own vehicle among the white lines 51, 52 at both sides of the target lane L2. When the lighting region Rlc includes the white line 52, the CPU makes an "Yes" determination at the step 870 and proceeds to a step 880 to set a value of the flag XS to "1". Thereafter, the CPU proceeds to the step 895 to tentatively terminate the present routine.

On the other hand, when the lighting region Rlc does not include the white line 52, the CPU makes a "No" determination at the step 870 and returns to the step 850. The CPU again determines, at the step 850, the irradiation region and the light intensity and at the step 860, again transmits to the ECU 30 the performing instruction of the light distribution change control. The CPU repeats the processing of the step 850 and the step 860 until an "Yes" determination is made at the step 870.

Figure 9:
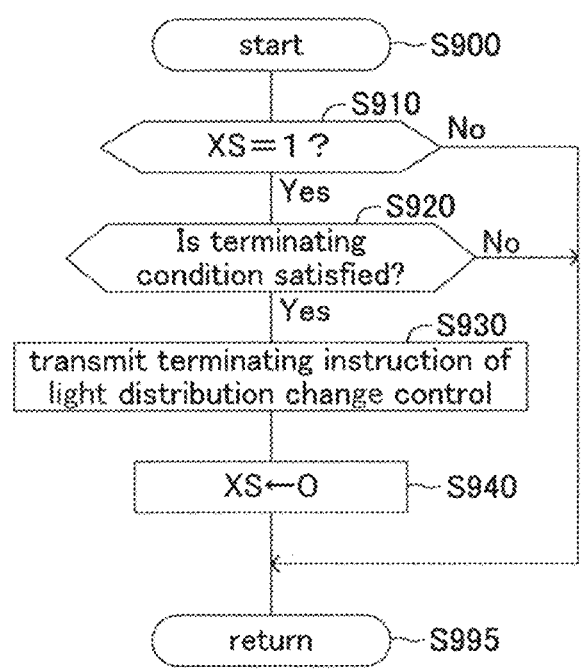
FIG. 9 is a flowchart showing a routine executed by CPU of ECU 10 shown in FIG. 1.

On the other hand, when a predetermined timing arrives, the CPU initiates processing from a step 900 in FIG. 9 and proceeds to a step 910 to determine whether or not a value of the flag XS is "1". When the value of the flag XS is "0", the CPU makes a "No" determination at the step 910 and proceeds to a step 995 to tentatively terminate the present routine. On the other hand, when the value of the flag XS is "1", the CPU makes an "Yes" determination at the step 910 to proceed to a step 920.

At the step 920, the CPU determines whether or not the above mentioned terminating condition is satisfied. When the terminating condition is not satisfied, the CPU makes a "No" determination at the step 920 and proceeds to a step 995 to tentatively terminate the present routine. On the other hand, when the terminating condition is satisfied, the CPU makes an "Yes" determination at the step 920 and execute processing of a step 930 and a step 940 in order.

At the step 930, the CPU transmits to the ECU 30 the terminating instruction of the light distribution change control. The ECU 30 controls the head lamp 31 based on this terminating instruction and thereby the light distribution change control is terminated.

At the step 940, the CPU sets a value of the flag XS to "0". Thereafter, the CPU proceeds to a step 995 to tentatively terminate the present routine.

As stated above, the present embodiment assumes, as a case where the request for the lane change is made by the driver, a case where the performance of the LCA is requested by the driver and a case where the lane change is attempted by the driving operation of the driver him/herself. Therefore, hereinafter, a description on the latter case will be made.

Processing regarding the light distribution change control in a case when the lane change is performed by the driving operation of the driver him/herself is executed by the CPU executing processing of a non-illustrated routine similar to the routines shown in FIG. 8 and FIG. 9. Hereinafter, the processing executed by the CPU will be described, focusing on differences.

The CPU determines, just as the processing at the step 830, whether or not there is a performing request for the lane change (an intention to perform the lane change). Specifically, the CPU determines that there is the performing request for the lane change when following conditions become both satisfied.

Condition 5. The CPU has received the on signal from the second winker switch 13.

Condition 6. The current situation is not a situation where the own vehicle is attempting to turn left or right.

Whether or not the condition 6 is satisfied may be determined based on the current position road information. It should be noted that whether or not the condition 6 is satisfied may be determined based on the information obtained by the camera sensor 16 or by known communication such as road-vehicle communication.

When having determined that there is the performing request for the lane change, the CPU determines, just as the processing at the step 850, the irradiation region and the light intensity for the light distribution change control. When the lane change is performed by the driving operation of the driver him/herself, a reference region for the irradiation region and a reference intensity for the light intensity have been set in advance, depending on the vehicle speed V. The CPU determines the irradiation region and the light intensity based on the reference region and the reference intensity, and thereby the lighting region Rlc is determined.

As described above, the lighting region is changed from the lighting region Rn to the lighting region Rlc by the light distribution change control, which enables the driver to properly determine whether or not there does not exist an object on the target lane which is likely to interfere with the lane change as well as to properly determine whether or not the lane change is feasible.

The CPU determines, just as the processing at the step 920, whether or not the terminating condition is satisfied. Specifically, when at least one of following condition 7 and condition 8 becomes satisfied, the CPU judges that the lane change has been performed to determine that the terminating condition becomes satisfied. Alternatively, when a following condition 9 becomes satisfied, the CPU judges that the driver gave up on performing the lane change to determine that the terminating condition becomes satisfied.

Condition 7. The own vehicle has travelled across (has straddled) a white line at a boundary between the own lane L1 and the target lane L2.

Condition 8. The steering angle has become zero after the condition 7 becomes satisfied.

Whether or not the condition 7 is satisfied may be determined based on the information obtained from the camera sensor 16. Note that whether or not the condition 7 is satisfied may be also determined based on the current position road information.

Condition 9. After the light distribution change control was started, the own vehicle did not travel across (did not straddle) the white line at the boundary within a predetermined time.

When the terminating condition becomes satisfied, the light distribution change control is terminated and the widening of the irradiation region is terminated.

Modification Example 1

A light distribution control apparatus for vehicle according to a modification example 1 (hereinafter, also referred to as a "first modification apparatus") performs lane change control by automatic driving (hereinafter, also referred to as "automatic lane change"). The automatic lane change is control to monitor the surrounding of the own vehicle and when it is determined that safe lane change is possible, to make the own vehicle automatically travel in such a manner that the own vehicle moves from the own lane to the target lane at the lane change direction side along with the target trajectory.

The ECU 10 of the first modification apparatus determines that there is a performing request for the automatic lane change (that is, a performing trigger for the automatic lane change has been detected) when an inter-vehicular distance to a preceding vehicle has become less than or equal to a predetermined distance during nighttime travelling. It should be noted that the ECU 10 may determine, in addition to this, that there is the performing request for the automatic lane change when the own vehicle is to enter a branched road (including an interchange, a junction, and the like) within a predetermined time based on known navigation system.

The ECU 10 starts the automatic lane change when a automatic lane change starting condition becomes satisfied. For example, the automatic lane change starting condition becomes satisfied when following conditions become all satisfied.

Condition 10. There is the performing request for the automatic lane change (The performing trigger has been detected).

Condition 11. A white line at the boundary between the own lane and the target lane is a dashed line.

Condition 12. The surrounding of the own vehicle is in a situation where safe lane change is possible.

Processing regarding the light distribution change control in a case when the automatic lane change is performed is executed by the CPU executing processing of a non-illustrated routine similar to the routines shown in FIG. 8 and FIG. 9. Hereinafter, the processing executed by the CPU will be described, focusing on differences.

The CPU determines, just as the processing at the step 830, whether or not there is the performing request (the performing trigger) for the automatic lane change. In other words, the CPU determines whether or not the condition 10 is satisfied.

The CPU determines, just as the processing at the step 840, whether or not the condition 11 is satisfied.

When having determined that the condition 10 and the condition 11 become satisfied, the CPU determines, just as the processing at the step 850, the irradiation region and the light intensity for the light distribution change control.

As described above, the lighting region is changed by the light distribution change control, which enables the CPU to properly determine whether or not the condition 12 is satisfied as well as to properly determine whether or not the automatic lane change starting condition is satisfied.

The CPU determines, just as the processing at the step 920, whether or not the terminating condition is satisfied. The terminating condition becomes satisfied when either one of following condition 13 or condition 14 becomes satisfied.

Condition 13. The automatic lane change starting condition becomes satisfied during the light distribution change control being performed and thereafter, the steering angle has become zero.

Condition 14. After the light distribution change control was started, the automatic lane change starting condition did not become satisfied within a predetermined time.

When the terminating condition becomes satisfied, the light distribution change control is terminated.

As described above, according to the present embodiment apparatus and the first modification apparatus, when the request for the lane change has been detected, the lighting region is changed from the lighting region Rn to the lighting region Rlc. The lighting region Rlc includes the region Rlc1 positioned at the target lane side with respect to the lighting region Rn. Therefore, it becomes easier to obtain the information on whether or not there does not exist an object on the target lane which is likely to interfere with the lane change. As a result. It becomes easier to determine whether or not the lane change is feasible when there is the request for lane change during nighttime travelling. In addition, according to the present embodiment apparatus, the lighting region Rlc includes the region Rlc1 mentioned above and the region Rlc2 which is a region where the lighting region Rn is reduced to a region near the own vehicle 100. The illuminance in the region Rlc2 is changed to be less than or equal to the "illuminance in a region corresponding to the region Rlc2 before the request for the lane change has been detected". According to this configuration, a degree of increase in power consumption due to changing the lighting region so as to include the region Rlc1 (the region positioned at the target lane side).

Especially, according to the present embodiment apparatus and the first modification apparatus, when the request for the lane change has been detected, the region Rlc1 (the region positioned at the target lane side) includes the white line 52 positioned at a farther side from the own vehicle among the white lines 51, 52 at both sides of the target lane L2. Therefore, it becomes possible to obtain more accurate information on whether or not there does not exist an object on the target lane which is likely to interfere with the lane change.

Modification Example 2

Figure 10:
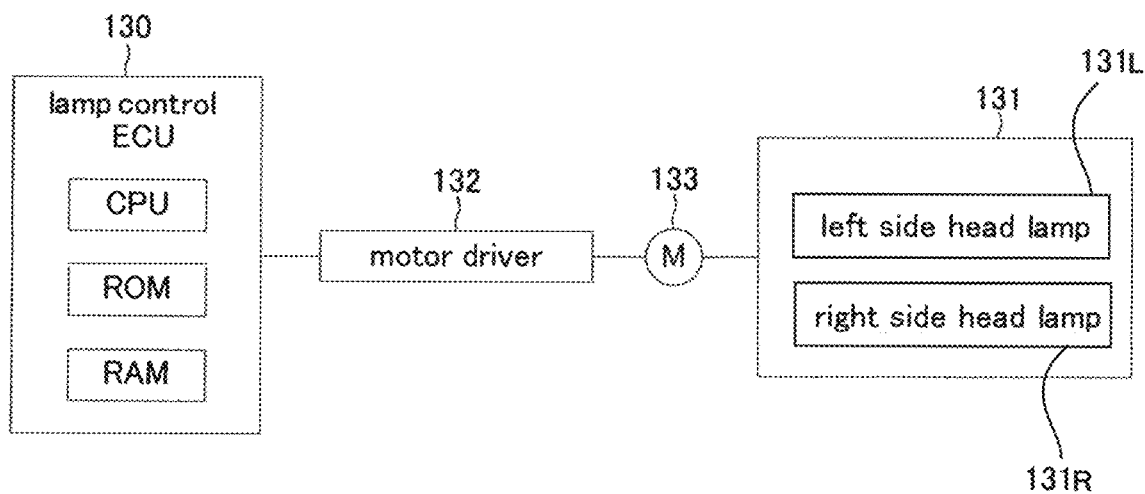
FIG. 10 is a partial schematic configuration diagram of a light distribution control apparatus for vehicle according to a modification example 2 of the present disclosure.
Figure 11:
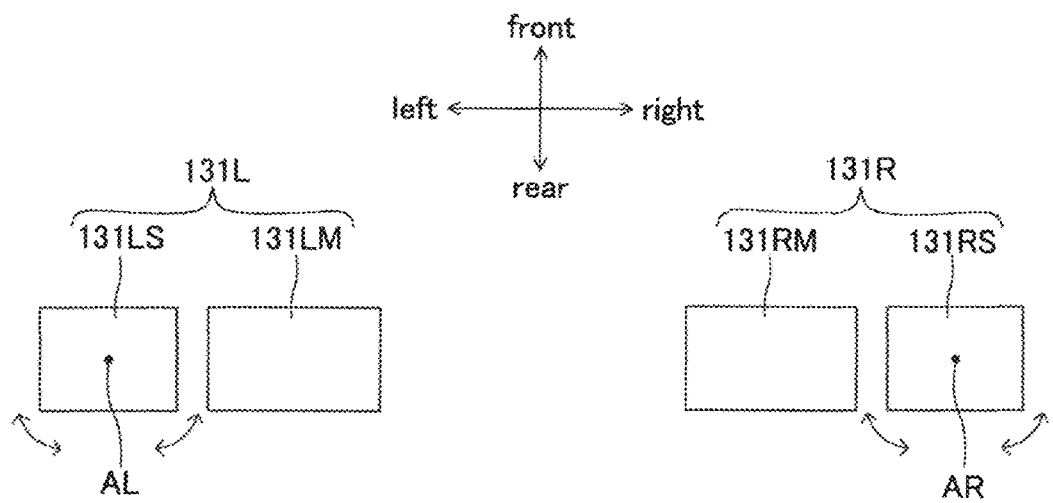
FIG. 11 is a diagram schematically showing a configuration of a head lamp of the modification example 2.

In a light distribution control apparatus for vehicle according to a modification example 2 (hereinafter, also referred to as a "second modification apparatus"), a configuration of a head lamp 131 is different from a configuration of the head lamp 31 of the present embodiment apparatus. As shown in FIG. 10, lamp control ECU 130 (hereinafter, also referred to as "ECU 130") is connected to a motor driver 132. The motor driver 132 is connected to a motor 133 for driving a head lamp. As shown in FIG. 11, the head lamp 131 comprises a left-side head lamp 131L and right-side head lamp 131R (Hereinafter, these are simply referred to as a "lamp 131L" and a "lamp 131R"). The lamp 131L (lamp 131R) comprises a main head lamp 131LM (131RM) and a sub head lamp 131LS (131RS). Hereinafter, these are simply referred to as a "main lamp 131LM (131RM)" and a "sub lamp 131LS (131RS)".

The head lamp 131 is a head lamp using, as a light source, a halogen lamp which functions as the high-beam. The ECU 130 controls turning on and off of each lamp 131LM (131RM) and 131LS (131RS), values of supplied current, and an irradiating direction of light of the sub lamp 131LS (131RS). That is, the sub lamp 131LS (131RS) is configured to be rotatable around a rotational axis AL (AR) extending in a z axis direction. Each motor 133 is arranged in a vicinity of the sub lamp 131LS and the sub lamp 131RS. The ECU 130 drives each motor 133 via the motor driver 132. When the motor 133 is driven, the sub lamp 131LS (131RS) rotates around the rotational axis AL (AR) and thereby the irradiating direction of light of the sub lamp 131LS (131RS) is changed.

When the light distribution change control is not being performed, the ECU 10 transmits to the ECU 130 control instruction to supply only the main lamps 131LM and 131RM with current having a first current value. The lighting region of when light is irradiated from the main lamps 131LM and 131RM has been designed in advance in such a manner that the lighting region includes the own lane and the white lines at both sides thereof of a general road to a relatively far position.

On the other hand, when the light distribution change control is being performed, the ECU 10 transmits to the ECU 130 control instruction to supply the sub lamp 131LS or 131RS positioned at the lane change direction side with current having a second current value smaller than the first current value, to supply the main lamps 131LM and 131RM with current having a third current value smaller than the first current value, and not to supply the sub lamp 131RS or 131LS positioned at an opposite side of the lane change direction with any current. In addition, the ECU 10 transmits to the ECU 130 control instruction to rotate the sub lamp 131LS or 131RS positioned at the lane change direction side around the rotational axis AL or AR in such a manner that "the lighting region shortens in the travelling direction and includes the own lane and the white lines at both sides thereof as well as the target lane and the white lines at both sides thereof".

Further, the ECU 10 is configured to increase the second current value and the third current value as the vehicle speed increases. Note that the ECU 10 is configured to calculate, at any vehicle speed, each current value in such a manner that power consumption of the head lamp 131 of when the light distribution change control is being performed becomes less than or equal to power consumption thereof of when this control is not being performed.

According to the second modification apparatus, similar effects to the present embodiment apparatus and the first modification apparatus can be obtained.

The present disclosure is not limited to the aforementioned embodiments and modification examples and may adopt various modifications within a scope of the present disclosure.

For example, the head lamp 31 was provided as one unit at center front end part of the own vehicle in the above embodiment. However, a number of the head lamp 31 and a layout thereof are not limited thereto. Head lamps may be provided at a front left end part and a front right end part of the own vehicle, respectively. For example, irradiation region of light irradiated from a left-side head lamp provided at the left end part may include the regions A1 to A9 in FIG. 4A, and irradiation region of light irradiated from a right-side head lamp provided at the right end part may include the regions A5 to A13 in FIG. 4A. In this case, the ECU 10 transmits to the ECU 30 control instruction to control the head lamps in such a manner that a sum of current values supplied for a group of LEDs included in the left-side head lamp and current values supplied for a group of LEDs included in the right-side head lamp will accord with the current value distribution shown in FIG. 5A when the light distribution change control is not being performed and will accord with the current value distribution shown in FIG. 6A when the light distribution change control is being performed.

The invention claimed is:

1. A light distribution control apparatus for vehicle comprising:
    an irradiating apparatus configured to irradiate light in front of an own vehicle; and
    an irradiation control apparatus configured to control said irradiating apparatus to be capable of changing a lighting region which is a region lightened by said irradiating apparatus as well as illuminance in said lighting region,
    wherein,
    said irradiation control apparatus is configured to:
        when said own vehicle is travelling on an own lane, lighten a predetermined first region including a region right in front of said own vehicle using said irradiating apparatus; and
        when a request for lane change to a target lane adjacent to said own lane occurs under a situation where said own vehicle is travelling on said own lane, lighten a predetermined second region using said irradiating apparatus, said second region including a region-at-a-lane-change-side positioned at said target lane side with respect to said first region and a reduced region which is a region where said first region is reduced to a region near said own vehicle as well as control said irradiating apparatus in such a manner that illuminance in said reduced region becomes less than or equal to illuminance in said reduced region before said request for lane change occurs.

2. The light distribution control apparatus for vehicle according to claim 1 further comprising a lane width obtaining apparatus configured to obtain a lane width of said target lane, wherein,
    when said request for lane change occurs, said irradiation control apparatus is configured to control said irradiating apparatus based on said obtained lane width in such a manner that said region-at-a-lane-change-side includes a carriageway marking line dividing said target lane.

3. The light distribution control apparatus for vehicle according to claim 1, wherein, said irradiation control apparatus is configured to control said irradiating apparatus in such a manner that lengths of said second region in a lane axis direction of said own lane and said target lane become longer as a vehicle speed of said own vehicle increases.

* * * * *